United States Patent [19]
Tozer

[11] 3,763,338
[45] Oct. 2, 1973

[54] POLYPYRROLIDONE FIBER FOR ACTIVATING SENSOR MEANS IN A HUMIDITY RESPONSIVE DEVICE

[75] Inventor: Job R. Tozer, Dallas, Tex.

[73] Assignee: Airac Corporation, Stamford, Conn.

[22] Filed: Jan. 6, 1972

[21] Appl. No.: 215,740

[52] U.S. Cl............ 200/61.06, 73/337.5, 236/44 A, 260/78 P
[51] Int. Cl. ......................................... H01h 35/42
[58] Field of Search............... 200/61.06; 236/44 A, 236/44 C; 260/78 P; 73/337, 337.5

[56] References Cited
UNITED STATES PATENTS

| | | | |
|---|---|---|---|
| 3,288,961 | 11/1966 | Thompson | 200/61.06 |
| 3,686,066 | 8/1972 | Peters | 260/78 P X |
| 2,509,593 | 5/1950 | Goddard | 200/61.06 UX |
| 2,210,656 | 8/1940 | Downs et al. | 236/44 A |
| 3,563,458 | 2/1971 | Martin | 236/44 A |
| 3,683,046 | 8/1972 | Jarovitzky | 260/78 P X |
| 3,681,296 | 8/1972 | Burks, Jr. | 260/78 P |
| 3,682,869 | 8/1972 | Jarovitzky | 260/78 P |
| 3,143,610 | 8/1964 | Gustafson | 200/61.06 |

Primary Examiner—J. R. Scott
Attorney—Jacobs & Jacobs

[57] ABSTRACT

A device responsive to changes in humidity is provided in which at least one strand of polypyrrolidone fiber is disposed between a stanchion and spring means, changes in the humidity being detected by means responsive to contraction and expansion of the polypyrrolidone strand.

10 Claims, 6 Drawing Figures

POLYPYRROLIDONE FIBER FOR ACTIVATING SENSOR MEANS IN A HUMIDITY RESPONSIVE DEVICE

DETAILED DESCRIPTION

The present invention pertains to an improved humidity responsive device which can be employed either for a direct reading of relative humidity or in association with humidity control equipment.

It is an object of the present invention to provide a humidity responsive device which accurately reflects the relative humidity over a wide range of normal atmospheric conditions.

A further object of the present invention, consistent with the foregoing object, is to provide a humidity responsive device which is substantially insensitive to temperature changes encountered in normal atmospheric conditions.

A still further object of the present invention is to provide a humidity responsive device which, once adjusted, requires little or no further adjusting so as to be suitable for, among other applications, remote installation.

These and other objects of the present invention will become apparent from the following description and the attached drawings in which.

Figure 1:
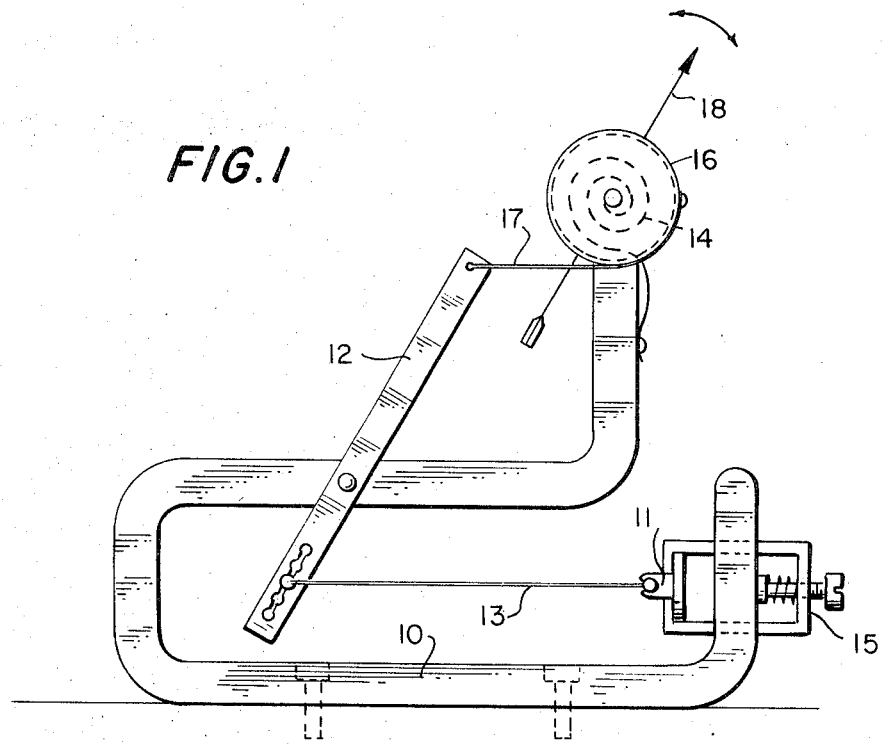
FIG. 1 is a schematic representation of one embodiment of the present invention in which the humidity responsive device provides readings of relative humidity through association with an appropriate dial and pointer.

Referring now to FIG. 1 in greater particularity, there is provided a base 10 on which is mounted stanchion 11. Pivotably mounted to the base is a swing lever 12. Fixed between swing lever 12 and stanchion 11 is at least one strand of polypyrrolidone fiber 13. Spring means 14 are provided to urge swing lever 12 in tensional opposition to the polypyrrolidone strand. Stanchion 11 is associated to base 10 through null adjust 15 so that the tensional stress of the polypyrrolidone fiber strand can be adjusted. Attached to the opposing end of swing lever 12 are means operable to detect movement of the lever. This comprises a pulley 16 pivotably mounted on base 10, a wire or string 17 attached to swing lever 12 and coiled about pulley 16. Rotational motion of pulley 16 is transmitted through any appropriate train to pointer 18.

Figure 2:
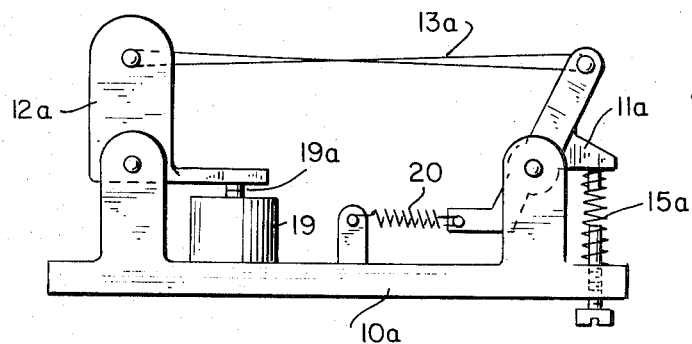
FIG. 2 is an elevation of a second embodiment of the present invention in which the humidity responsive device is associated with switching means which, in turn, may be employed in the activation of humidity control equipment (not shown)
Figure 3:
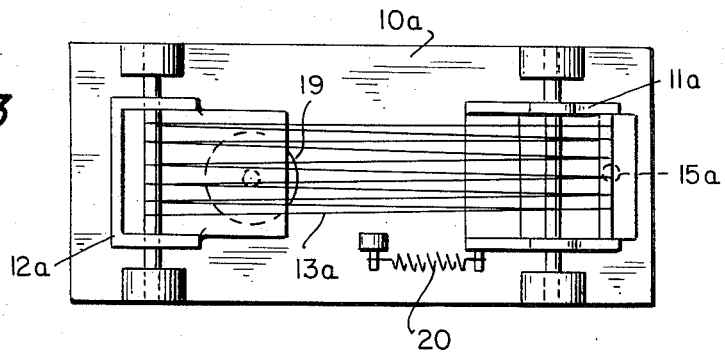
FIG. 3 is a top view of the embodiment depicted in FIG. 2.

In FIGS. 2 and 3, swing lever 12a activates switch 19 mounted on base 10a, the tensional opposition of swing lever 12a to the polypyrrolidone strand 13a being provided by switch button 19a. In addition to being attached to swing lever 12a, polypyrrolidone strand 13a is also attached to stanchion 11a. Adjustments on the tension of polypyrrolidone strand 13a are effected through use of the null adjust 15a in opposition to spring 20.

Figure 5:
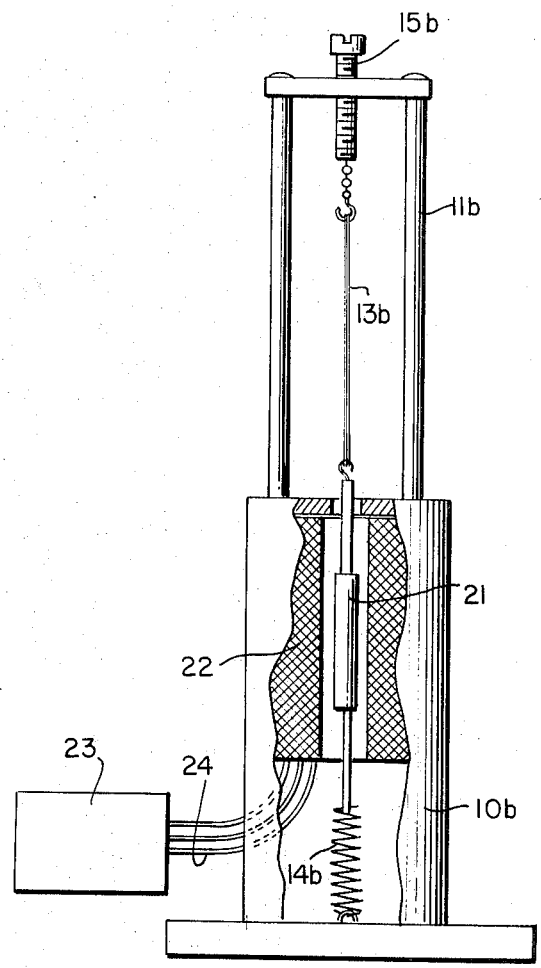
FIG. 5 is a schematic representation of a further embodiment utilizing electrical reading means.

In FIG. 5, the strand of polypyrrolidone 13b is attached at one end to stanchion 11b through null adjust 15b and at the other end to magnetic rod 21. Magnetic rod 21 is in turn attached to spring means 14b which maintains tension on strand 13b. Surrounding magnetic rod 21 and mounted on base 10b is electromagnetic pickup 22 which is electrically connected to responsive means 23 (either readout, transmittal or control) through connectors 24. In place of inductive sensing means, one can employ a capacitive sensor in the apparatus of FIG. 5 or alternatively a pneumatic or hydraulic sensor.

Figure 4A:
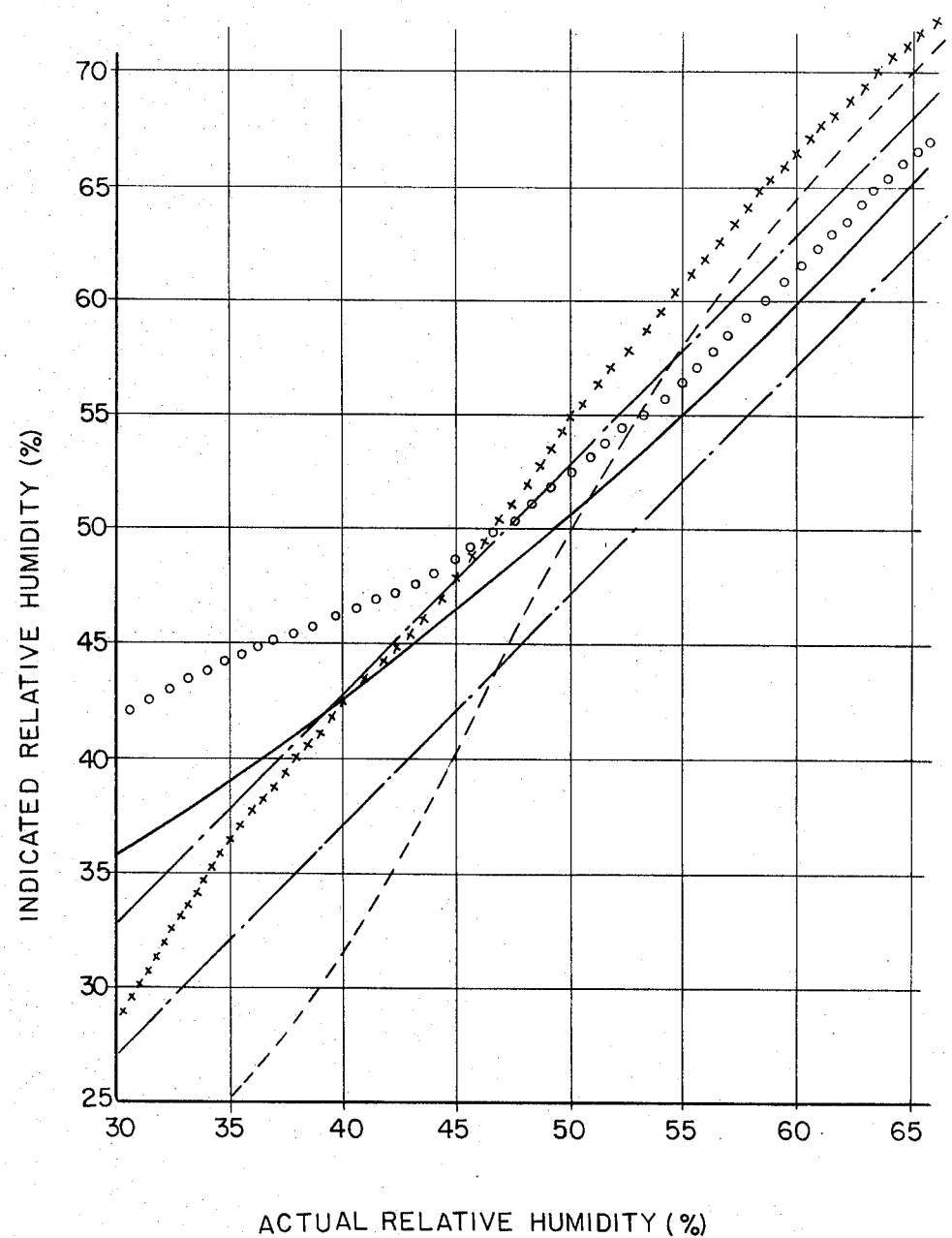
FIG. 4A and 4B are a plotting of actual relative humidity to recorded relative humidity with the sensing element of the present device and with various other humidity responsive materials.
Figure 4B:
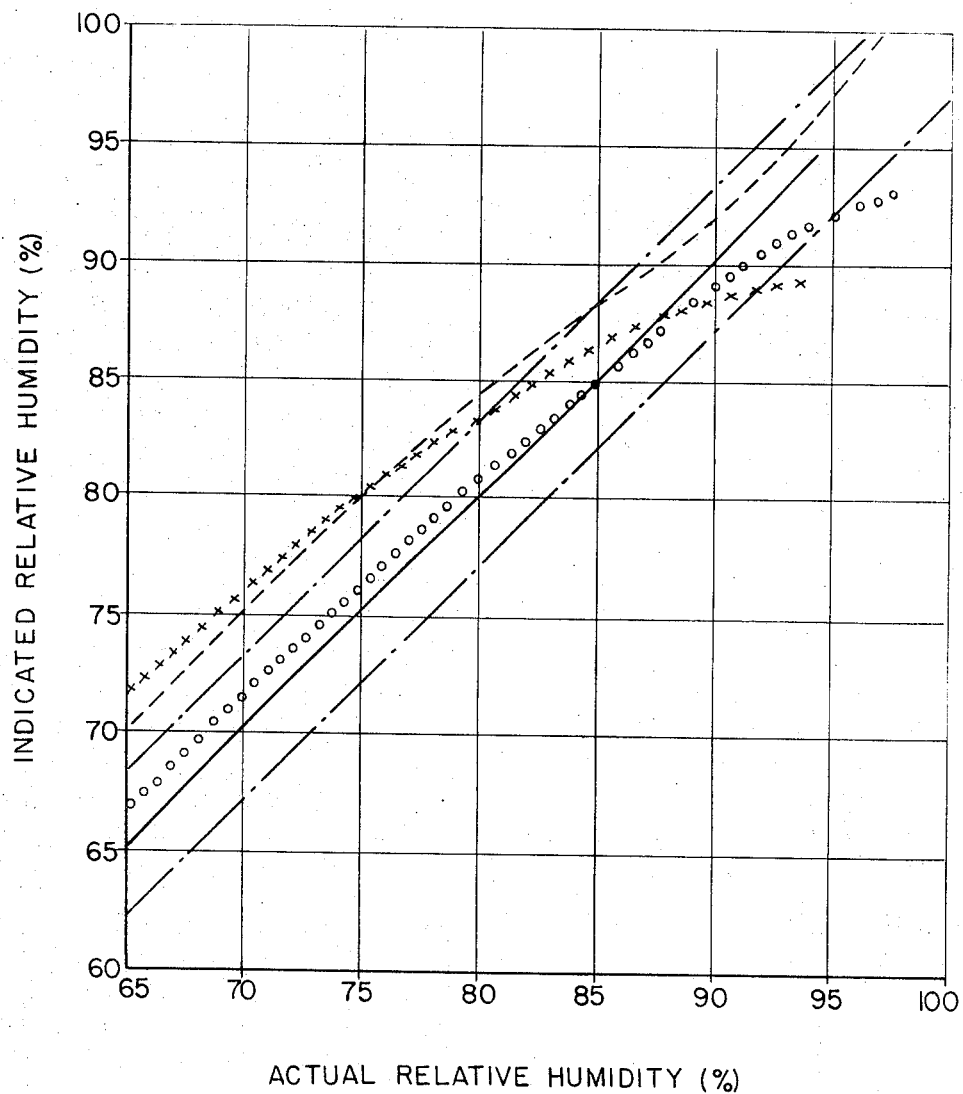

As noted in connection with FIGS. 1, 2, 3 and 5, the humidity responsive device of the present invention employs as its key component at least one strand of polypyrrolidone fiber fixed between spring means 15, 15a and 15b and stanchion 11 or 11a, respectively, either directly as in FIG. 5 or through swing lever 12 or 12a in FIGS. 1, 2 and 3. The unique humidity responsive properties of polypyrrolidone fiber permits a direct and linear reading of relative humidity over a wide range and a nearly linear reading over even a wider range. This can be seen in FIGS. 4A and 4B. Thus from 40 percent relative humidity to 95 percent relative humidity, the response of polypyrrolidone is linear when measured at 80°F. An accuracy well within ± 2.5 percent is observed when the temperature is ranged from 40°F to 120°F. In this range, the sensitivity of polypyrrolidone is approximately 0.0013 in./in./% RH. The material exhibits virtually no hysteresis. Although there is some loss of linearity of response below 40 percent relative humidity, it is relatively small, largely within the 3 percent error factor, and easily compensated, as for example through utilization of non-linear readout indicia at the lower end of the indicator dial. As a result of its exceptional linearity of response to humidity changes, polypyrrolidone represents a significant improvement over substances heretofore employed as humidity sensors such as human hair, nylon-6, and animal membranes, such as goat gut, none of which provide such a linear response. In addition, polypyrrolidone is exceptional in its absence of hysteresis, minimal temperature deviations, and freedom from fatigue.

Although numerous references describing polymers of pyrrolidone exist, the specialized requirements for the material employed in the present invention are satisfied only with the recently available polymers of 2-pyrrolidone which are capable of forming white fiber by melt extrusion and having an inherent viscosity of at least about 2.5 dl/g, expressed in terms of a 0.5 g/dl solution in hexafluoroisopropanol at 30°C. Such material can be prepared when 2-pyrrolidone is polymerized in the presence of an alkaline polymerization catalyst and carbon dioxide, generally at least 0.01 percent by weight of carbon dioxide, based on the weight of 2-pyrrolidone monomer. These polymers of 2-pyrrolidone and the method of their preparation are described in detail in South African Patent No. 69/1727. It has been found that only polypyrrolidone such as that which is produced in accordance with this method can it be readily melt extruded into the long fibers necessary to produce the special characteristics required for the present invention. Hence the polymer of 2-pyrrolidone which is suitable for use in the present device will have the ability after a 5 gram sample is held at 270°C. under a pressure of 6.7 × 10$^6$ dynes/cm$^2$ in a Slocum melt indexer having a single hole spinnerette of 20 mils in diameter and 80 mils in length for 4 minutes to form a continuous filament for at least 3 minutes after the spinnerette hole is opened.

Returning now to FIGS. 1 — 3 and 5, it will be observed that the strand of polypyrrolidone is fixed between stanchion 11, 11a or 11b and spring means 14, 20 or 14b, respectively. While in its simplest embodiment, a single strand of polypyrrolidone is employed, the sensitivity of the entire device can be increased through utilization of a plurality of strands. These may be a series of strands, each attached to the stanchion and swing lever, or may be a single strand passed over each in a continuous loop. The length of the polypyrrolidone strand 13 and 13a is a matter of choice; generally it has been found that a length of from one to two inches, preferably about one and a half inches, provides satisfactory results.

In operation, the device is installed and corrected to the actual relative humidity, as determined for example through the use of a dry bulb hygrometer, through utilization of null adjust 15 or 15a. Subsequent increases in humidity will effect a lengthening of the polypyrrolidone strand 13 and 13a. In the embodiment shown in FIG. 1, this lengthening will release the tension on wire 17, thereby causing spring means 14 to urge pulley 16 in a counterclock-wise direction, this rotation being, in turn, transferred to pointer 18 for the appropriate readdown on a dial (not shown). A corresponding reduction in humidity will cause a contraction of polypyrrolidone strand 13 and this contraction will, in turn, be transmitted to a dial through pointer 18 in a similar fashion to that described above. In the embodiment shown in FIGS. 2 and 3, an increase in humidity will cause a lengthening of polypyrrolidone strand 13a and swing lever 12a will thus be urged away from the switch button 19a of switch 19. Upon a decrease in relative humidity, polypyrrolidone strand 13a will contract, causing swing lever 12a to depress switch button 19a and thereby activate the particular circuit involved. In the apparatus of FIG. 5, humidity responsive contractions or expansions of polypyrrolidone strand 13b causes corresponding movements of magnetic rod 21. These movements produce an electrical signal in coil 22 through inductance which signal is transmitted to response means 23. Response means 23 may be a simple readout mechanism, a recording mechanism, a control mechanism or transmitting mechanism as in a remote installation. As noted the sensor may be of the capacitive, hydraulic or pneumatic rather than inductive type.

The foregoing description and drawings represent typical embodiments of the present invention but are not intended as a limitation on the scope thereof, it being apparent that the invention can be practiced through obvious modifications and rearrangements without departing from the essential spirit thereof.

What is claimed is:

1. A humidity responsive device comprising a base, a stanchion mounted on said base, at least one strand of polypyrrolidone fiber attached to said stanchion, spring means operative to maintain said polypyrrolidone strand in tensional opposition to said stanchion, means for adjusting the tensional stress of said strand, and sensor means operable to detect humidity-responsive expansion or contraction of said strand of polypyrrolidone.

2. A humidity responsive device according to claim 1 wherein said polypyrrolidone is a melt extruded fiber of a polymer of 2-pyrrolidone having an inherent viscosity of at least about 2.5 dl/g obtained through the polymerizaton of 2-pyrrolidone in the presence of an alkaline polymerization catalyst and the presence of carbon dioxide.

3. A humidity responsive device according to claim 2 wherein a plurality of strands of polypyrrolidone fiber are disposed between said spring means and said stanchion.

4. A humidity responsive device according to claim 3 wherein the said sensor means operable to detect expansion and contraction of said polypyrrolidone strands is a dial and pointer.

5. A humidity responsive device according to claim 3 wherein said sensor means operable to detect expansion and contraction of said polypyrrolidone strands is an electrical switch.

6. A humidity responsive device according to claim 3 wherein said sensor means operable to detect expansion and contraction of said polypyrrolidone strands is an inductive transducer.

7. A humidity responsive device according to claim 3 wherein said sensor means operable to detect expansion and contraction of said polypyrrolidone strands is a capacitive transducer.

8. A humidity responsive device according to claim 3 wherein said sensor means operable to detect expansion and contraction of said polypyrrolidone strands is a pneumatic sensor.

9. A humidity responsive device according to claim 3 wherein said sensor means operable to detect expansion and contraction of said polypyrrolidone strands is a hydraulic sensor.

10. A humidity responsive device according to claim 1 further characterized in that a swing lever is pivotably mounted on said base, and a plurality of strands of polypyrrolidone fiber are disposed between said swing lever and said stanchion, said spring means being operative to urge said swing lever in tensional opposition to said stanchion through said strands.

* * * * *